(12) United States Patent
Zammit et al.

(10) Patent No.: US 9,734,724 B2
(45) Date of Patent: Aug. 15, 2017

(54) METHOD AND SYSTEM FOR RECOVERING THE ENERGY STATE OF AN AIRCRAFT DURING DESCENT

(71) Applicant: University of Malta, Msida (MT)

(72) Inventors: Brian Zammit, Mosta (MT); David Zammit-Mangion, Mellieha (MT)

(73) Assignee: University of Malta, Msida (MT)

( * ) Notice: Subject to any disclaimer, the term of this patent is extended or adjusted under 35 U.S.C. 154(b) by 0 days.

(21) Appl. No.: 14/841,948

(22) Filed: Sep. 1, 2015

(65) Prior Publication Data
US 2016/0063867 A1 Mar. 3, 2016

Related U.S. Application Data

(60) Provisional application No. 62/044,563, filed on Sep. 2, 2014.

(51) Int. Cl.
*G08G 5/00* (2006.01)
*G05D 1/10* (2006.01)
*G08G 5/02* (2006.01)

(52) U.S. Cl.
CPC ........... *G08G 5/0039* (2013.01); *G05D 1/101* (2013.01); *G08G 5/025* (2013.01); *Y02T 50/84* (2013.01)

(58) Field of Classification Search
CPC ...... G08G 5/0039; G08G 5/025; G05D 1/101; Y02T 50/84
See application file for complete search history.

(56) References Cited

U.S. PATENT DOCUMENTS

| | | | |
|---|---|---|---|
| 8,352,169 B2 | 1/2013 | Coulmeau et al. | |
| 8,948,937 B2 | 2/2015 | Constans et al. | |
| 2013/0030612 A1* | 1/2013 | Constans | ............... G05D 1/101 701/14 |

FOREIGN PATENT DOCUMENTS

FR 2949577 A1 3/2011

OTHER PUBLICATIONS

Extended European Search Report for European Patent Application No. 15183528.7 issued on Jan. 28, 2016.

\* cited by examiner

*Primary Examiner* — Anne M Antonucci
(74) *Attorney, Agent, or Firm* — Harness, Dickey & Pierce, P.L.C.

(57) ABSTRACT

A method and system is provided for the recovery of an aircraft energy upset in a time-constrained descent. The system includes a computational unit to assess a number of adjustments involving a combination of speed changes, aerodynamic brake deployment and track miles adjustments that alter the energy dissipation profile whilst allowing the aircraft to maintain a pre-determined time-of-arrival over an incoming waypoint along the original descent path.

11 Claims, 7 Drawing Sheets

METHOD AND SYSTEM FOR RECOVERING THE ENERGY STATE OF AN AIRCRAFT DURING DESCENT

FIELD OF THE INVENTION

The present invention relates to flight management of fixed-wing aircraft and, more particularly, to a method and system for recovering the aircraft's energy state to enable the aircraft to comply with energy and time constraints during descent. More specifically, a recovery advisory enables a pilot to capture altitude and speed targets using a combination of adjustments that alter the aircraft power along an updated lateral path to provide a feasible recovery solution that allows large energy deviations to be recovered with minimal violation of arrival time.

BACKGROUND OF THE INVENTION

As an aircraft approaches its destination, it needs to descend from its cruising altitude to land at the destination airfield and, in the process, also slow down to the appropriate descent speeds and honor any time constraints imposed by air traffic control (ATC). This implies that, from the top-of-descent point to touchdown, the aircraft needs to lose kinetic and potential energy at the appropriate rate, dissipating it as it flies down the descent path. In the scope of the present invention, the sum of kinetic and potential energy is referred to as the aircraft's energy. Correctly managing energy loss requires adequate planning which, whilst being a routine task for the flight crew, distractions or delay in descent and/or slowing down can result in the aircraft arriving at salient points throughout the descent with inadequate energy levels. Tactical complications such as those involving weather or unplanned traffic constraints may result in ATC requesting a combination of speed and altitude deviations that may preclude the flight crew from executing the planned descent actions. This, of course, interferes with the energy dissipation plan and requires the crews to be vigilant in assessing and taking action to recover any energy upsets in time before approach and landing in such circumstances.

Consequently, inadequate energy management is a major concern in the descent and approach phases of flight to continued safety in flight operations, and has been considered as a potential precursor to unstabilised approaches. When descent energy deviates from an intended profile, corrective recovery actions need to be taken in good time. The task of recovering from an undesirable energy state whilst approaching a terminal area significantly increases the crew workload, particularly when operating into busy airfields in bad weather conditions or high terrain. Even in today's environment where the time-of arrival is not enforced, there is still a need to provide energy management and alerts to the crew, as they do not currently have a reliable means of identifying the solutions that can be adapted. Current practices allow some form of visualization of the target aircraft recapture point along the flight plan, but it is very difficult to get a clear picture of the future situation when alterations to the lateral flight plan will be required.

A number of incidents have occurred where incorrect energy management was cited as one of the main causal factors leading to the event. Indications suggest that energy handling difficulties can sometimes be traced to actions carried out in the descent, sometimes as early as initial descent. Despite the expected safety enhancement associated with the introduction of trajectory based operations (TBO) envisaged by Single European Sky Air Traffic Management Research (SESAR) and Next Generation Air Transportation System (NEXTGEN) for the future air navigation system, disruptions to the intended descent path or actions will remain. These disruptions may be due to unexpected conditions associated with weather, traffic, runway closures, aircraft malfunctions, inappropriate aircraft control or other unaccounted operational scenarios. As a result, situations will continue to occur where an aircraft diverges from the intended energy profile.

With the introduction of continuous descent approach (CDA) procedures, these deviations are becoming more difficult to recover. This is due to steeper profiles, that enable a continuous descent at idle thrust with minimal level segments associated with today's step-down descents. The aircraft will therefore have more energy than those flying current day procedures and therefore smaller deviations will be required before the aircraft energy is unrecoverable within the remaining track distance to the runway, requiring air traffic control (ATC) intervention.

some conventional systems in current generation aircraft already provide an indication relating to the lateral and vertical deviations from the flight plan. This information, together with the descent speed, can be used by the flight crew to assess the aircraft's energy state and determine whether any corrections are required to adjust the total energy (which can be achieved by adjusting engine thrust, speed or drag) or the distribution between the kinetic and potential energy (by trading off speed for altitude). A further possible adjustment is changing the lateral path to vary the remaining track miles to be flown, thus increasing the distance over which the excess energy can be dissipated. However, conventional systems do not provide any advice to the crew in selecting the appropriate actions when energy adjustments are required. Such advice is particularly desirable when time-of-arrival constraints are also imposed, as any deviations from the original descent plan would introduce variations in the time-of-arrival instant. For instance, an aircraft would arrive late if track miles were added to the flight plan (to increase the energy dissipation distance) without adjusting the descent speed. The required automation, therefore, needs to take into consideration both the energy and time constraints imposed on the descent path such that any energy recovery adjustments do not, if possible, disrupt the intended time of arrival at salient waypoints. Accordingly, it is desirable to provide an improved aircraft system that is capable of determining the required adjustments to recapture the aircraft's energy whilst honoring speed, altitude and time constraints at salient points along the descent trajectory.

SUMMARY OF THE PRESENT INVENTION

The present invention mitigates at least some of the limitations of prior art. The system enables an aircraft that has deviated from its intended flight plan or energy profile to arrive at a point in space ahead of the said aircraft with the desired speed and, if possible, at the desired moment in time, is disclosed. For the purpose of clarity and simplicity, the system presently disclosed is hereinafter referred to as the 'system'.

The method and system disclosed herein are provided to assist a flight crew in recovering from abnormal energy situations that are considered beyond the control authority of the typical guidance methods by suggesting easy to follow recovery advisories. The method and system are presented as a technique in which a guidance technique is not assumed but can be used in conjunction with active guidance methods to improve the recovery authority.

Although not exclusively, the present invention applies particularly to the descent phase of flight, when the aircraft has already crossed the intended top-of-descent point and is therefore committed on a descent profile. If the system detects or predicts a potential energy upset (which is considered to be a deviation from the energy the aircraft is expected to have if it were on the correct flight path with the expected speed and weight schedule), the system initializes a numerical process to determine a new trajectory, flight profile or aircraft configuration, or a combination thereof, and the associated necessary actions that will be required to simultaneously recapture, if possible, the planned energy state and the time-of-arrival at a future position along the descent path. Due to data errors, a mathematical solution to solve the multiple equations simultaneously may not theoretically exist. Consequently, the solution that will be required is the one that allows a small error (often called a residual) to remain in an attempt to solve the equations simultaneously and for this, in the present embodiment, an optimization algorithm is used to minimize the error. Advantageously, the use of an optimization algorithm to solve such equations allows the operator (the pilot) to choose where the residual error is to be allowed, that is whether in speed, altitude or time of arrival. For example if it is impossible to overfly a specific waypoint with an exact energy and time combination, the smallest deviation in either energy or arrival time or a chosen combination of both can be achieved. When it is physically impossible to arrive at the target point in space at the desired speed and time, then it is also possible for the operator to choose a balance of deviations in terms of speed, time and altitude associated with the relevant waypoint.

When the system identifies a new trajectory, flight profile or aircraft configuration and associated recovery actions, it generates data pertaining to these and outputs accordingly. For example, the system may present the proposed recovery actions to the crew for consideration. In accordance with a present embodiment, the recovery actions are specified in terms of target autopilot and engine thrust modes, speed adjustments, duration of aerodynamic flap deployment and adjustments to the lateral trajectory. The recovery procedure can then be flown using the aircraft's tactical auto-flight system. In yet another embodiment, the system may output the data directly to the aircraft's flight management system or, if the system is ground-based, it outputs the data to a datalink that transmits the said data to the aircraft systems via a wireless link.

BRIEF DESCRIPTION OF THE DRAWINGS

The novel features believed characteristic of the illustrative embodiments are set forth in the claims. The illustrative embodiments will be best understood by reference to the following detailed description of an illustrative embodiment of the present disclosure when read in conjunction with the accompanying drawings, wherein:

DETAILED DESCRIPTION

Various example embodiments will now be described more fully with reference to the accompanying drawings.

The following detailed description provides illustrative embodiments of the subject matter. However, specific structural and functional details disclosed herein are merely illustrative in nature and are not intended to limit the embodiments of the subject matter or the application and uses of such embodiments. The invention may be embodied in many alternate forms and should not be construed as limited to only the embodiments set forth herein.

Accordingly, while illustrative embodiments are capable of various modifications and alternative forms, the embodiments are shown by way of example in the drawings and will be described herein in detail. It should be understood, however, that there is no intent to limit illustrative embodiments to the particular forms disclosed. On the contrary, illustrative embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing illustrative embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted might occur out of the order noted in the figures unless otherwise indicated. For example, two figures shown in succession may in fact be executed substantially concurrently or may sometimes be executed in the reverse order, depending upon the functionality/acts involved.

Specific details are provided in the following description to provide a thorough understanding of illustrative embodiments. However, it will be understood by one of ordinary skill in the art that illustrative embodiments may be practiced without these specific details. For example, systems may be shown in block diagrams so as not to obscure the illustrative embodiments in unnecessary detail. In other instances, well-known processes, structures and techniques may be shown without unnecessary detail in order to avoid obscuring illustrative embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware. The operations can be implemented using existing hardware in existing electronic systems (e.g., display drivers, System-on-Chip (SoC) devices, SoC systems, electronic devices, such as personal digital assistants (PDAs), smartphones, tablet personal computers (PCs), laptop computers, etc.).

Such existing hardware may include one or more Central Processing Units (CPUs), digital signal processors (DSPs), application-specific-integrated-circuits (ASICs), SoCs, field programmable gate arrays (FPGAs), computers, or the like, configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "memory," "memory unit," "storage medium," "computer readable storage medium," and the like, may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Furthermore, illustrative embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
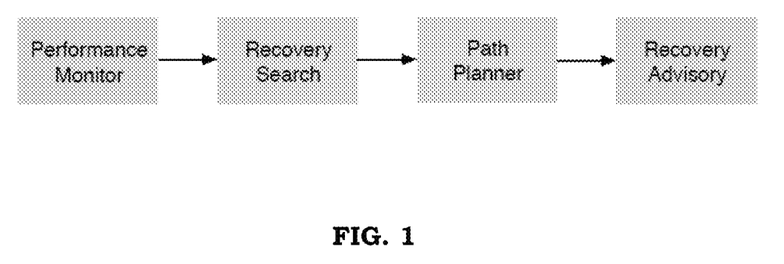
FIG. 1 is an illustration of a high level overview of the individual processes required for energy recovery assistance and their interaction.

A high level overview of the individual processes required for the energy recovery assistance and their interaction is presented in FIG. 1. The concept requires a performance monitor to assess the aircraft energy during the descent. This monitor triggers the recovery process when an incorrect energy condition is detected. The recovery searches candidate recovery options and identifies the possible actions for recovering the energy within the ATC imposed time constraints, using the available onboard automation. When the solution requires a track adjustment to the original route, the path planner provides the required lateral route. The final solution is presented as a recovery advisory for crew consideration and execution. A preferred embodiment of the energy recovery system 34 that implements energy recovery is presented in FIG. 2. The energy recovery system 34 comprises a computational unit 36, an input/output device 35 that supports wired and/or wireless communication, a data storage device 37, a display device 75 and a user input device 48. The user input device may be, but is not limited to, a keyboard, touch screen, mouse, tracker ball, a combination of these or any other similar device or devices. When the user input device 48 is a touch screen, it may also act as the display device 75.

Figure 2:
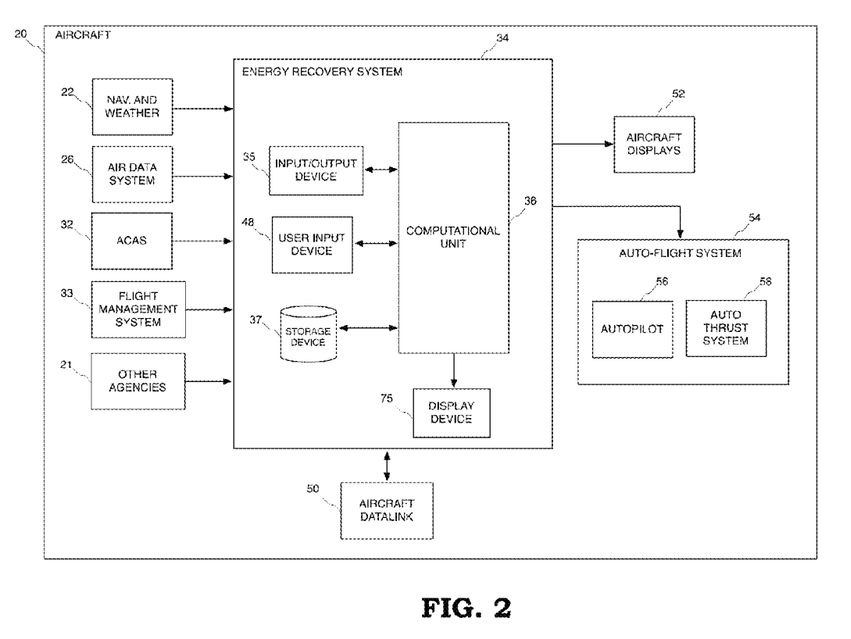
FIG. 2 is an illustration of a present embodiment of the energy recovery system.

The energy recovery system 34 may require inputs from various sources and may output data to various other aircraft systems. For example, in a present embodiment, the energy recovery system 34 communicates via the input/output device 35 with the aircraft's flight management system 33 for aircraft, navigation and weather information 22, the air data system 26 for air data including true airspeed, calibrated airspeed, altitude and vertical speeds, and the airborne collision avoidance system (ACAS) 32 for traffic data. It is understood that datasets may be retrieved from other sources that may be on board the aircraft 20 or from other agencies 21, particularly as systems and sources depend on the specific aircraft and technology. For example, some aircraft are equipped with Automatic Dependent Surveillance-Broadcast (ADS-B) receivers that provide traffic data to other systems on board the aircraft 20 and it is understood that such systems may be used in lieu of others for the sourcing of data. Also, weather data such as, but not limited to, wind speeds and directions at various points along the flight path, may be obtained from meteorological offices or other such agencies 21 providing such data.

In a present embodiment, the energy recovery system 34 can display the proposed trajectory on the aircraft displays 52 using the available navigation displays (ND) and primary function display (PFD) and command the auto-flight system 54. In an alternative embodiment, the energy recovery system 34 may output the recovery trajectory plan to the flight management system (FMS) 33, which, in turn, commands the auto-flight system 54. The energy recovery system 34 may be a standalone computer, residing on-board the aircraft 20. Alternatively, the energy recovery system 34 may be integrated as part of the FMS 33. The energy recovery system 34 may also be a portable computational device such as, by way of example, a laptop, tablet or electronic flight bags (EFB). It is understood that such a portable device may communicate with the aircraft systems via the input/output device 35 that may be wired or wireless. It is also understood that communication between systems external to the energy recovery system 34 may be replaced by direct pilot entry via, for example, the user input device 48 and by displaying the outputs generated by the energy recovery system 34 on, for example, the display device 75, to allow the pilot to then program with the appropriate aircraft system such as the flight management system 33. By way of non-limiting example, the present embodiment describes a standalone system on board the aircraft 20 that is capable of communicating directly with other aircraft systems.

In a present embodiment, the storage device 37 stores data such as, but not limited to, data associated with operational thresholds and mathematical models such as those pertaining to the aircraft dynamics and engines. It may also store models describing the atmosphere and weather behavior. In an embodiment of the present invention, the system retrieves weather information in electronic format from meteorological stations or other aircraft that can relay weather information via a suitable aircraft datalink 50. Other data that are resident of the aircraft's systems, such as those associated with the flight plan and constraints, zones of restricted airspace arrival procedures, destination aerodrome information, etc. are accessed via the input/output device 35. Furthermore, data may also be exchanged with other systems external to the aircraft 20 via the input/output device 35 and/or the aircraft's data link 50. Furthermore, it is understood that data can be grouped and arranged in different formats and databases and can be accessed from different sources. Consequently, data may be stored in the storage device 37 or retrieved from aircraft systems via the input/output device 35.

Figure 3:
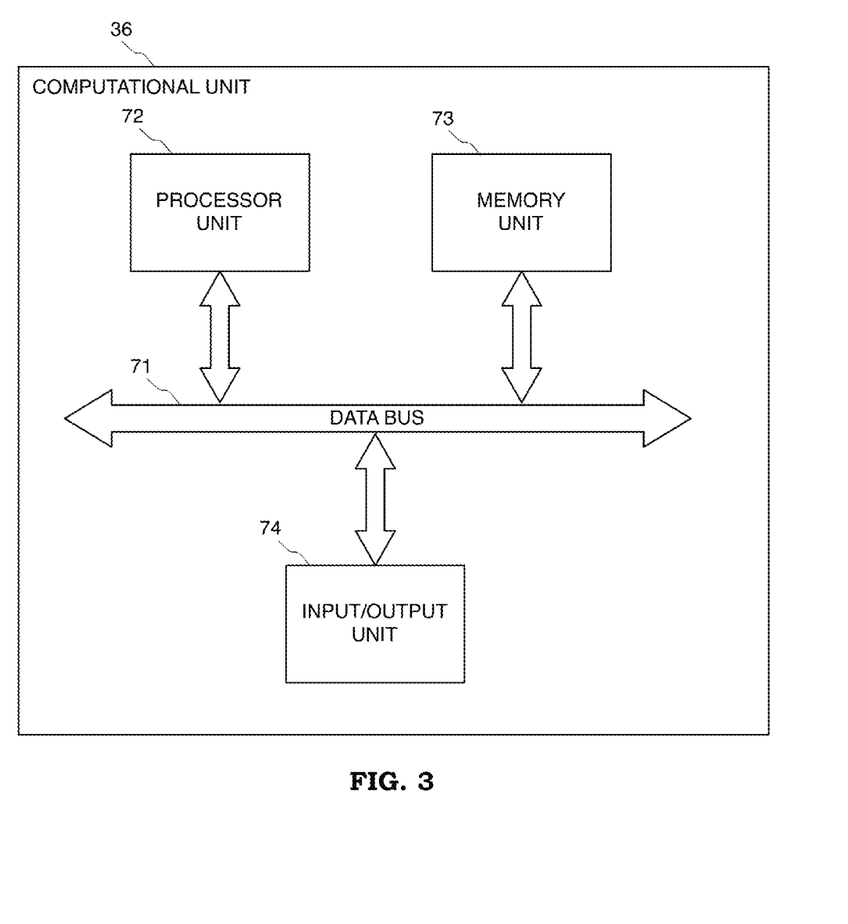
FIG. 3 is an illustration of a present embodiment of the computational unit in accordance with the illustration of the present embodiment.

FIG. 3 presents a diagram illustrating an example of the internal organization of the computational unit 36. The computational unit 36 comprises a data bus 71, a data input/output unit 74, a processor unit 72 and a memory unit 73. The data input/output unit 74, processor unit 72, and memory unit 73 send and receive data to one another via the data bus 71. The data input/output unit 74 includes the necessary hardware and/or software for data communication external to the computational unit 36 and within the energy recovery system 34. For example, input/output unit 74 may provide a connection between the processor unit 72 and the user input device 48 or the display device 75. In a present embodiment, the processor unit 72 is a microprocessor capable of executing instructions that may be loaded into the memory unit 73. It is understood that the processor unit 72 executes instructions implementing the energy recovery process and may have different forms. For example, the processor 72 may be a microcontroller or may comprise a number of processors, a multi-processor core, or some other type of processor, depending on the particular implementation. The memory unit 73 stores instructions for implementing the energy recovery process and may be any device capable of storing data including magnetic storage, flash storage, or similar, that can either store suitable information on a temporary basis and/or a permanent basis.

Figure 4:
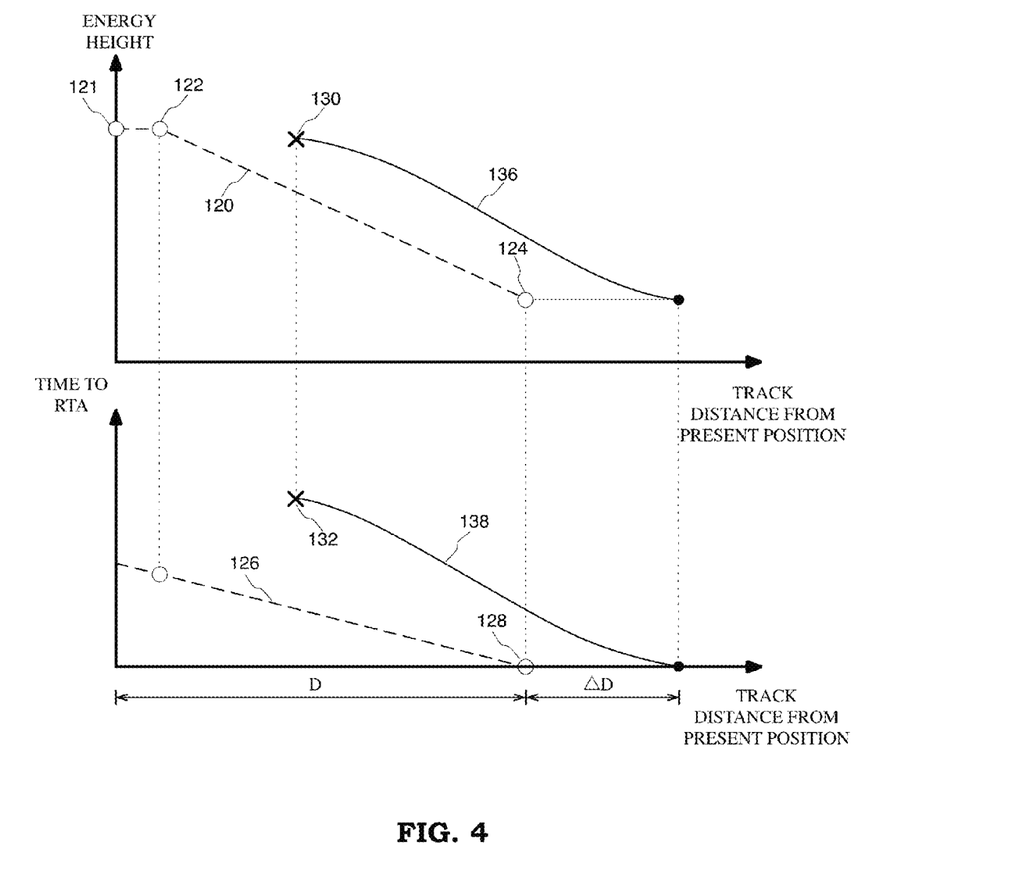
FIG. 4 is an illustration of a graph of aircraft energy height and time to a waypoint for an aircraft in descent.

With reference to FIG. 4, aircraft energy height and time to arrival at a point in space (such as the Required Time of Arrival (RTA) or RTA at a particular waypoint) are illustrated as a function of track distance to be flown in a descent. Waypoints (hereinafter referred to as "target fixes") are usually used in flight to define salient points along a trajectory, including during a descent. The time at which the aircraft is required to overfly the waypoint defines the RTA, which, mathematically generates a time constraint associated with the relevant target fix. Mathematically, each target fix is also associated with an energy state (in terms of target inertial speed $V_i$ and altitude h) the aircraft is expected to have at that point. This is of particular importance in the descent, where it may be expressed as a total energy constraint at a particular target fix using $E=mgh+mV_i^2/2$ assuming an aircraft weight mg, resulting in an energy constraint expressed in Joules. Furthermore, if this energy constraint is divided by weight, the resulting term has units of length only and represents the altitude the aircraft would attain if all the kinetic energy had to be converted to potential energy without any losses. Consequently, this value is then called the energy height constraint. For example, in FIG. 4, the aircraft 20 has an energy constraint 124 at the target fix of interest located in the planned descent path a distance D from the present position of the aircraft. Line 120 depicts the nominal energy profile required to lower the aircraft energy from its present value 121 which, in cruise, is usually equal to the energy value at top-of-descent position 122, to that required at the target fix 124. Similarly, line 126 represents the nominal time profile for capturing the required time constraint 128 at the target fix of interest. However, aircraft may deviate from the target energy and time profiles during operation. For example, when the aircraft has an excess kinetic energy, excess potential energy or a combination of the two, then the aircraft energy height is higher than the planned value (point 130). If the actual time is also early (point 132) with respect to the nominal time profile (that is, the aircraft is early and therefore has more time available to arrive to the target fix than desirable), the crew needs to take appropriate actions to recover the energy and time deviations.

In a present embodiment of the invention disclosed herein, the energy recovery system 34 monitors the energy and time states of the aircraft and defines flight strategies to enable the aircraft 20 to arrive on the target fix 124 at the designated time and/or with the desired energy, thus mitigating at least some the effects associated with aircraft having excess energy height and/or arriving early.

Accordingly, the energy recovery system 34 described herein performs a computation process that identifies required automation adjustments to force the aircraft states to follow recovery profiles for energy 136 and time 138, using the minimum possible track extension ΔD. This results in the aircraft capturing the target fix at the correct energy 124 and time-of-arrival 128 constraints. It is understood that track extensions refer to extensions to the planned flight path, which result in lateral deviations in order to allow the aircraft to fly over the target fix at the correct energy state and time.

When it is physically not possible to arrive at the selected target fix at the required time of arrival with the target energy, in a present embodiment, the system prefers a recovery profile that allows the aircraft to arrive at the said target fix with the correct energy and will allow a minimum time variation from the desirable RTA. It is understood that variations of this strategy may be adopted. For example, in another embodiment, the system 34 may propose a recovery profile that reduces the delay with respect to the desirable RTA by allowing the aircraft to arrive at the target fix with a higher energy than planned. This may be advantageous in certain operating conditions as, for example, when a delay in the crossing time does not result in violation of traffic separation and the aircraft can still recover the desired energy at a point further ahead in the planned flight path.

Figure 5:
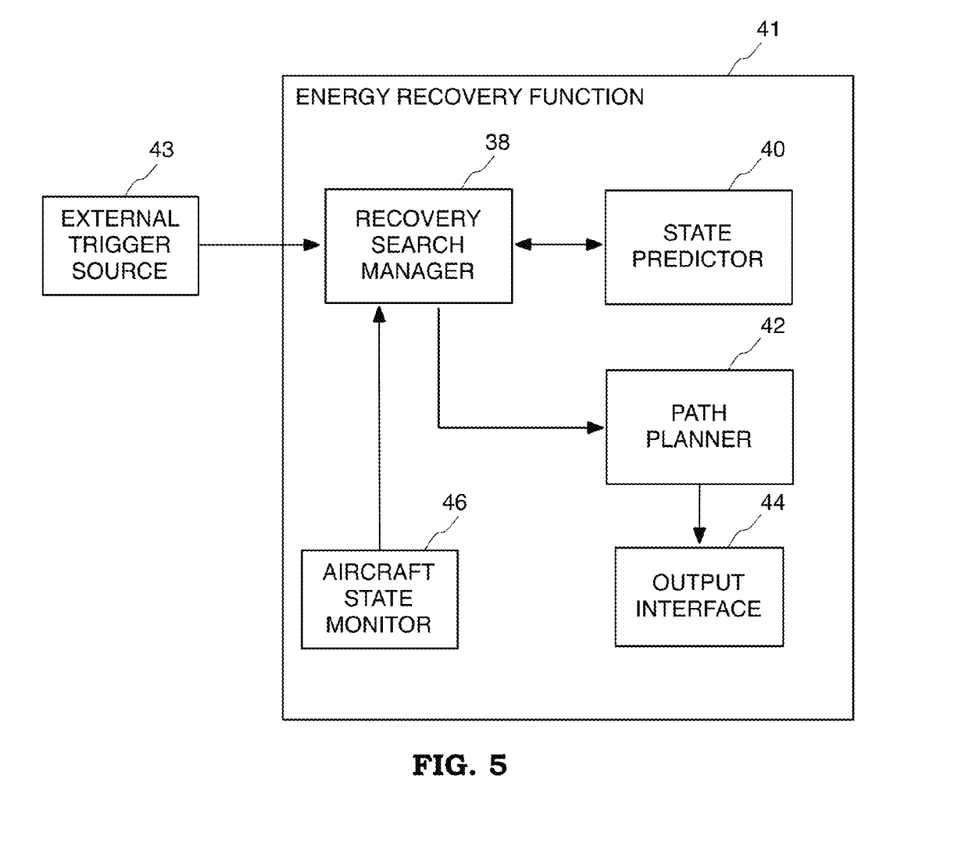
FIG. 5 is an illustration of the Energy Recovery Function in accordance with an illustrative embodiment.

FIG. 5 presents a schematic of a preferred arrangement of the energy recovery function 41 performed by the energy recovery system 34. It is noted that the energy recovery function 41 and all its sub-functions (i.e. 38, 40, 42, 44 and 46) are implemented using software programs residing in memory unit 73 and executed by processor unit 72. The resulting functionality is represented by the computational unit 36 of the energy recovery system 34 in an example embodiment. The aircraft state monitor 46 performs the performance monitoring function of FIG. 1 and is automatically initiated at a predefined distance ahead of the start of the descent and continues to run throughout the descent phase of the flight, continuously monitoring and assessing the energy state of the aircraft, in terms of its total energy or energy height, as well as any time deviation with respect to the flight plan (i.e. whether it is early or late).

In an example embodiment, the aircraft state monitor 46 may request a recovery search by triggering the recovery search manager 38 to perform the recovery search of FIG. 1 when the present aircraft energy exceeds allowed deviations from the nominal energy profile 120 or nominal time profile 126 that may, for example, be pre-computed using a planned descent speed profile and descent altitude constraints that are stored in a database within the storage device 37. In another illustrative embodiment, the aircraft state monitor 46 assesses the predicted aircraft energy and time-of-arrival at the target fix 124 by projecting the energy state along the planned trajectory, taking into account the effect of aircraft state parameters such as the current autopilot and auto-thrust mode together with prediction uncertainties on the energy state projection. In a further embodiment, a recovery search request triggering the recovery search manager 38 may originate from other sources such as an external trigger source 43 external to the energy recovery function 41. It is understood that external trigger sources can be one or more of a plurality of sources, such as, for example, but not limited to, a manual crew override or another on-board system requiring energy recovery assistance such as interval management systems.

The objective of the recovery search is to identify a recovery plan that brings the aircraft energy from the current conditions back on to the nominal profile with minimal violation of time constraints. The solution is defined using a number of trajectory control parameters that enable the identification of the energy recovery plan to be cast as a numerical search problem. Such trajectory control parameters may include, but are not limited to 1) Autopilot mode; 2) Calibrated Airspeed (CAS) target; 3) Distance-to-fix (DTF); 4) Speedbrakes duration; and 5) Rate-of-descent (ROD). In an example embodiment, the autopilot mode refers to fixed tactical control modes, as provided using the glareshield control panel. These modes allow the selection of individual targets such as airspeed or vertical rate that select a fixed elevator and thrust control mode.

The recovery search manager 38 coordinates and executes the actions required to identify a recovery plan. In an exemplary embodiment, the recovery plan is parameterized in terms of required autopilot and auto-thrust modes, speed targets, speed-brake deployment duration and track miles adjustments required before the target fix. It is understood that different parameters and combinations of parameters may be used to define the recovery plan.

According to a preferred embodiment of the present invention, the values of the parameters defining the recovery plan (flight path and flight plan) are calculated by carrying out a numerical optimization process to identify the preferred recovery plan. It is, of course, understood that different techniques to identify the preferred recovery trajectory, may be used. In the present embodiment, upper and lower bound constraints for each parameter may be defined through data transfer from aircraft systems such as, but not limited to, the air data system 26 and the flight management system 33, or directly input by the pilot through the user input device 48. Advantageously, an optimization technique is used that allows for residual errors in the solution, which translates to a tolerance of, for example, but not limited to, RTA, speed, altitude or a combination of these at the target fix.

The optimization technique used by the recovery search manager 38 may use known mathematical computations and techniques that solve the general optimization problem. Such an optimization problem requires the selection of an n-dimensional design vector $X=(x_1, x_2, \ldots, x_n)$ that minimizes an objective function (or cost function) $f(X)$ subject to known inequality constraints $g_j(X)$ for $j=1,2,\ldots,m$, equality constraints $l_j(X)$ for $j=1,2,\ldots,p$ and bounds (lower and upper) associated with the design vector. In order to reduce the number of computations necessary to generate an output, thus allowing the system to propose a recovery profile in real-time (i.e. during flight), the optimization problem considers the vertical and horizontal (plan, or lateral) profiles separately, first optimizing the vertical profile to identify the preferred recovery plan including any required adjustments to the track miles required. The identified strategy is then used to define the plan path.

Theoretically, the optimization problem should calculate the vertical and horizontal profiles combined, and the simplification may consequently introduce some errors. To reduce any such errors, the optimization process first calculates a solution for the vertical profile and this is not adjusted during the determination of the preferred horizontal path. As a result, any energy and time errors arising from simplification assumptions during the vertical profile search (mainly due to assumed wind speed and directions) are only minimized by adjusting the horizontal profile, without re-computing the vertical solution.

In a present embodiment, the energy recovery system is modeled by a set of known differential equations. Such a configuration allows the design vector of the optimization problem to represent a static selection of target control values or alternatively a function of target control values along the optimal trajectory. Depending on the form of the design vector, the problem is then treated as a static or dynamic optimization problem. In the present embodiment, the objective function is defined as a function of multiple static design parameters.

In addition, both objective and constraint functions are non-linear and therefore the resulting problem is a constrained non-linear programming (NLP) problem. Such a problem can be solved using a range of techniques including derivative-free optimization methods such as evolutionary algorithms or alternatively using active-set methods, such as the Sequential Quadratic Programming (SQP) or interior point methods. In the present embodiment, these computations are based on SQP methods that are generally known and easily solved using standard Non-Linear Programming (NLP) solvers. It is understood, however, that different NLP solvers can be used and, furthermore, that the objective function can be defined in terms of dynamic parameters.

The optimization process may include, but is not limited to, models of the atmosphere and weather, the aircraft dynamics and auto-flight systems to predict the aircraft states for preferred recovery plan. These models may reside within the state predictor 40 and use data stored in the storage device 37. The state predictor 40 predicts the state of the aircraft along a particular recovery path and returns the appropriate state data, such as, but not limited to, the expected energy and time-of-arrival at a selected point or target fix ahead of the aircraft. It is understood that different state data and formats may be used to describe the said predicted flight path. In another exemplary embodiment, the functionality of the state predictor 40 is externally provided by prediction capabilities of the on-board FMS 33.

A fundamental capability of the energy recovery function is the ability to project the aircraft states from its current location to the target fix location along candidate recovery trajectories using the state predictor. For a typical descent, the process involves modeling an initial acceleration segment from the current speed to the recovery speed. This is followed by a constant recovery calibrated airspeed (CAS) segment and finally a deceleration segment to capture the target speed at the target waypoint 124.

In an example embodiment, the aircraft performance model used by the state predictor is based on the Eurocontrol Base of Aircraft Data BADA Rev. 3.9 model. This model, referred to as Total Energy Model (TEM) uses a relationship that equates the power of the aircraft, to changes in potential and kinetic energy, assuming the aircraft is near to a trimmed flight state. The total energy model uses the concept of the Energy Share Factor (ESF), to allocate the available excess/deficit power between potential and kinetic energy rates.

A simplified aircraft point-mass model may be used to increase the computation speed of the state prediction. The model is simplified by ignoring the effect of the rate of change of wind on the true airspeed and on the rate of change of flight path angle. This simplification results in a constant airspeed during sudden wind variations, which, in turn, produces sudden changes in ground speed. This assumption provides accurate results only when the wind velocities are slowly changing in time or space. This model simplification is believed to be used by at least some flight management systems manufacturers. The resulting model consists of the following nonlinear equations of motion:

$$dx/dt = V \cos \psi \cos \gamma + w_x$$

$$dy/dt = V \sin \psi \cos \gamma + w_y$$

$$dh/dt = V \sin \gamma + w_h$$

$$dV/dt = [T - D - mg \sin \gamma]/m$$

$$d\Psi/dt = L \sin \Phi / mV$$

The model consists of kinematic states defined as plan position (x and y), geometric altitude (h), flightpath angle ($\gamma$), heading angle ($\Psi$) and a single dynamic state variable is defined as aircraft true airspeed (V). The control inputs are the engine thrust (T), and the bank angle ($\Phi$). The energy share factor is then used as an additional input and replaces the flight path angle variable using $\sin \gamma = (T-D)ESF/mg$. Thrust (T), is a function of airspeed, altitude and control mode, and drag (D) is a function of airspeed, altitude and aircraft configuration. The aircraft mass is considered constant throughout the descent, and is expected to provide a good approximation during idle thrust descents, but lacks adequate accuracy when considerable thrust inputs are commanded. $w_x$ and $w_y$ are the horizontal components of wind, $w_h$ is the vertical wind and g is the acceleration of gravity.

To ensure the aircraft tracks the reference flight leg course in the presence of wind, the aircraft heading, $\psi$, is adjusted to counteract the wind. The state predictor integrates the aircraft states along the original flight plan by modeling the aircraft flying along each flight leg at wings level and assuming instantaneous turns at the waypoints. An international standard atmosphere (ISA) model provides predictions for the air pressure, temperature and density values required to calculate engine thrust, aerodynamic drag and speed of sound, whereas actual wind predictions at discrete altitude levels are used, with vertical wind speed set to zero. Wind at intermediate altitude levels is extracted using linear interpolation. The aircraft initial conditions enable the equations of motion to be integrated using an explicit Runge-Kutta method.

The optimized recovery solution identified by the recovery search manager 38, using the state predictor 40 is transferred to a path planner 42 that generates the required adjustments to comport with the flight plan (usually resident in the flight management system 33 of the aircraft 20). If the path planner 42 determines that the track miles that need to be flown to the target fix 124 is more than the amount of miles planned in the flight plan, path extensions may be inserted into the flight plan using extension techniques such as doglegs or any other extension maneuvers. If, instead, the track miles that need to be flown are shorter than the amount of miles planned, the path planner shortens the planned path where possible. The path planner 42 may also check the updated flight plan to ensure, for example, that the aircraft can maintain adequate separation from other traffic and avoid bad weather, restricted airspace or any other zone as may be operationally required. The path planner 42 then transfers the recovery plan consisting of an updated flight plan and target autopilot values to an output interface 44 that handles the data and formats the data into forms compatible with the display device 75 of the energy recovery system 34 or the aircraft displays 52. For example, the output interface 44 may also format the data in a format that is compatible with existent ATC formats or other datalink formats that allow transfer of the data to ATC via the datalink 50. The output interface 44 may also format data to program the flight management system 33 of the aircraft 20.

Figure 6:
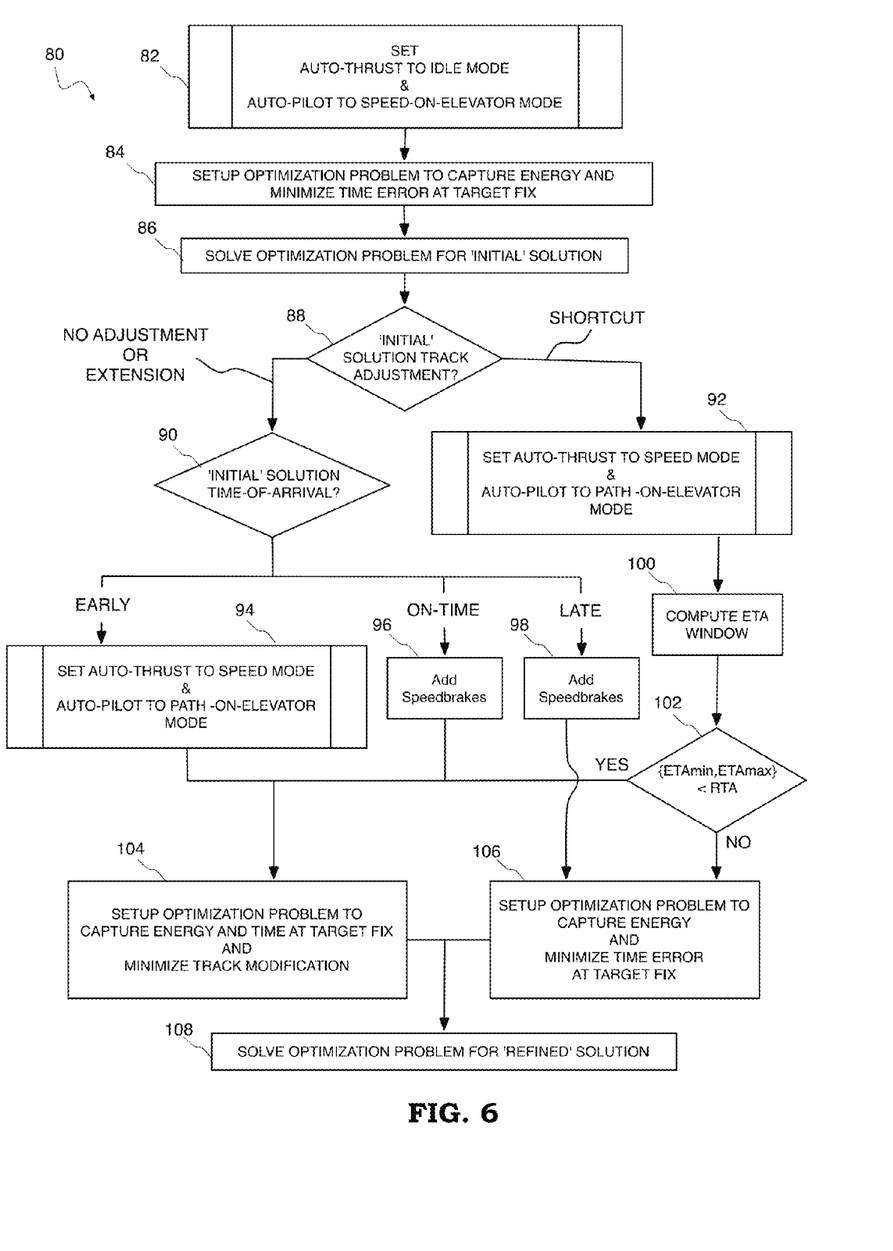
FIG. 6 is an illustration of the flowchart of the process associated with a preferred embodiment of the present invention.

FIG. 6 shows a flowchart of an example embodiment of a method 80 for determining the vertical profile of the recovery plan in accordance with an illustrative embodiment of the recovery search manager 38 being disclosed. It is noted that all steps of method 80 are implemented by the recovery search manager 38 and that the resulting vertical solution is then forwarded to the path planner 42 to plan for the horizontal profile. In this example method, the optimization problem is set up such that the target energy is defined as an optimization constraint that needs to be met. The time-of-arrival is then defined as the objective to be minimized. In most cases, this setup will allow for the identification of a solution that captures both energy and time requirements. However, when this is not the case, as described earlier, this setup allows the identification of a solution that captures the target energy and allows a minimal deviation in arrival time. Such a strategy may be adopted to ensure the continued safety of the flight, which is a priority over the arrival time. It is, however, understood that different strategies can be adopted if desired. In the first step 82, the automation mode often referred to as "open descent" is selected in the aircraft model for assessment.

The optimization parameters are set up in step 84, with the target energy defined as a constraint in the optimization problem and time error at the target fix as the objective function to be minimized. The resulting nonlinear problem (NLP) is solved in step 86 using the state predictor 40 to assess candidate recovery solutions. The optimal solution resulting from this step is called the 'initial' solution and consists of a target descent speed that defines a vertical path profile together with the optimal track distance to be flown by the aircraft 20. This solution is then used as a basis for identifying whether any refinements are needed (including in the auto-flight mode) to enable a 'refined' solution to be identified. The 'refined' solution may improve the time-of-arrival capture with a reduced track modification, as will be further disclosed. Accordingly, in step 88, a decision may be made whether adjustments to the 'initial' solution generated by step 86 would be preferred. If a shortening of the track is desired, the method proceeds to step 92, otherwise, the method 80 advances to step 90. Any adjustment to the track miles (shortening or extensions) are planned using the path planner 42 as will be described in the following sections. However such horizontal planning is only conducted when a final 'refined' vertical solution is identified by method 80.

Step 90 determines whether the aircraft 20 will arrive early, on time or late at the target fix when flying the 'initial' solution generated in step 86. If an early arrival is expected, the method advances to step 94. Alternatively, if an on-time or late arrival is expected, the method 80 advances to steps 96 and 98 respectively.

In step 94, an automation mode where thrust controls the speed of the aircraft and elevator controls the flight path angle to control the aircraft model is selected for assessment. It is understood that different automation modes may be selected as the precise mode may depend on the type of aircraft being flown and the models used. The mode selected needs to allow the path planner 42 to assess recovery options at non-idle thrust, effectively reducing the aircraft energy dissipation rate along the path to be flown. This facilitates the introduction of a delay in the time-of-arrival by introducing track extensions along the descent path whilst controlling the energy dissipation. An optimization problem is next defined in step 104, where the energy and time at the target fix are defined as constraints with the objective to keep variations in track distance flown to a minimum. Finally a 'refined' solution is generated in step 108.

If, in step 90, the 'initial' solution is estimated to result in the aircraft 20 arriving at the target fix on time, the initial auto-flight mode is retained because all the constraints can be satisfied. In this case, the deployment of speedbrakes is considered to allow the aircraft to lose energy at a faster rate whilst flying at the same speed. Accordingly, step 96 introduces the extension of the speed brakes as part of the optimization problem setup in step 104. A 'refined' solution is then generated using steps 104 and 108 as described above.

If, in step 90, the 'initial' solution is estimated to result in the aircraft 20 arriving at the target fix late, the deployment of speedbrakes is again considered in the optimization problem. However, in this case, it may be impossible to arrive on time with the 'initial' solution. This results in a different optimization problem from the case when the aircraft is early or on time, resulting in a different optimization problem setup step 106. Consequently, in such situations, the 'refined' solution is generated via step 108.

If, in step 88, a shortcut in the 'initial' solution is estimated to be advantageous, the method proceeds to execute step 92, which selects an appropriate auto-flight mode for the aircraft model to that selected in step 94.

The method then proceeds to step 100, which determines the variations in descent speed and corresponding time-of-arrival range possible (minimum ETA, maximum ETA) for the updated auto-flight mode for the aircraft to fly the original path and still arrive at the target fix with the target energy. Step 102 then determines whether the RTA falls within the estimated possible time-of-arrival range determined in step 100. If this is the case, the method proceeds to execute steps 104 and 108 in sequence to generate the 'refined' solution; otherwise it executes steps 106 followed by step 108 to generate it. In the present embodiment, the method used to generate the 'refined' solution in step 108 is identical to that used in step 86.

The path planner 42 receives the proposed solution and introduces the required flight plan modification to adjust the remaining distance to the target fix. Track reductions (i.e. short cuts) are only possible if the aircraft is not on a direct course to the target fix and therefore the profile of the remaining lateral flight path limits the extent of possible track reduction. When track reductions are required the path planner 42 identifies an intermediate waypoint, at which point the aircraft is turned on a direct course to the target fix to effectively cut the corner.

Figure 7:
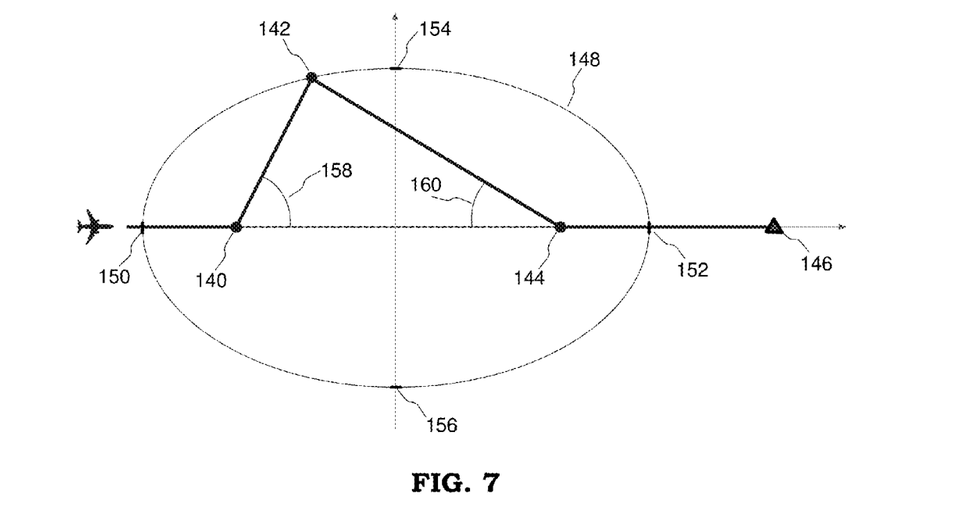
FIG. 7 is an illustration of the dogleg path extension geometry associated with a preferred embodiment of the present invention.

In the event track extension is required by the 'refined' solution of method 80, FIG. 7 shows the construction of possible track extensions that are based on the commonly-used delay absorption techniques consisting of three waypoints. The aircraft is directed off the path of the flight plan at a turnout waypoint 140 and maintains specific heading until it is turned back at a turn-back waypoint 142 on a direct course to a downstream capture waypoint 144 to then continue towards the target fix 146. In two-dimensions, the solution space for a fixed extension along a straight flight leg is contained within the boundary of an ellipse 148 having focal points at 140 and 144. The ellipse can be defined by a major axis and a minor axis (represented by the distance 150 to 152 and 154 to 156 respectively in FIG. 7).

Since the turn-back point 142 lies at the boundary of a continuous solution space, an infinite number of valid selections can be obtained by varying the turnout angle 158. In addition, it is possible to vary the distance between the turnout and turn-back points (140 and 144) while maintaining the same extension by reconstructing the ellipse boundary. This again results in an infinite number of valid ellipse geometries. To limit the number of solutions, the dogleg geometry in the present embodiment is restricted to a number of (triangular) extension patterns with predefined turnout angle 158 and capture angle 160.

During operation, the extension patterns are scaled and positioned along the original route to introduce the desired path extensions. One extension pattern is then selected based on operator selection or to maximize separation from surrounding traffic or weather hazards or to minimize the affected track deviation. Allowances are then introduced to cater for local wind effects and aircraft turn performance before the final solution is generated. It is understood that different techniques can be adopted to restrict or select from the large or infinite number of combinations of said ellipse geometries. Furthermore, it is understood that different geometries can be used to calculate a path extension.

When the triangular path extension contains long segments of straight flight, the track errors introduced by the turning transitions are small and may be ignored. If however, the path extension contains large proportions of turning flight, the accuracy of the resulting track distance will be inadequate using only said technique. This is particularly evident when the extensions are planned at short distances from the target fix, where large heading turns are required to follow the extension path.

To improve the path extension geometry, and thus the accuracy of the path prediction, the present embodiment includes a second method for generating doglegs when the remaining distance to the target fix is short. In this method, the extension geometry is defined as concatenation of a series of curves and straight-line segments resulting in a continuous representation of the extension path. This method allows a direct consideration of the aircraft turn dynamics and can be specified using standard methods such as straight track-to-fix (TF) legs and fixed radius transitions specified for Area Navigation (RNAV) operations. The TF leg connects two waypoints by a straight line, whereas the fixed radius transition is defined using a constant radius turn between a start and an end point around a given centre point.

Figure 8:
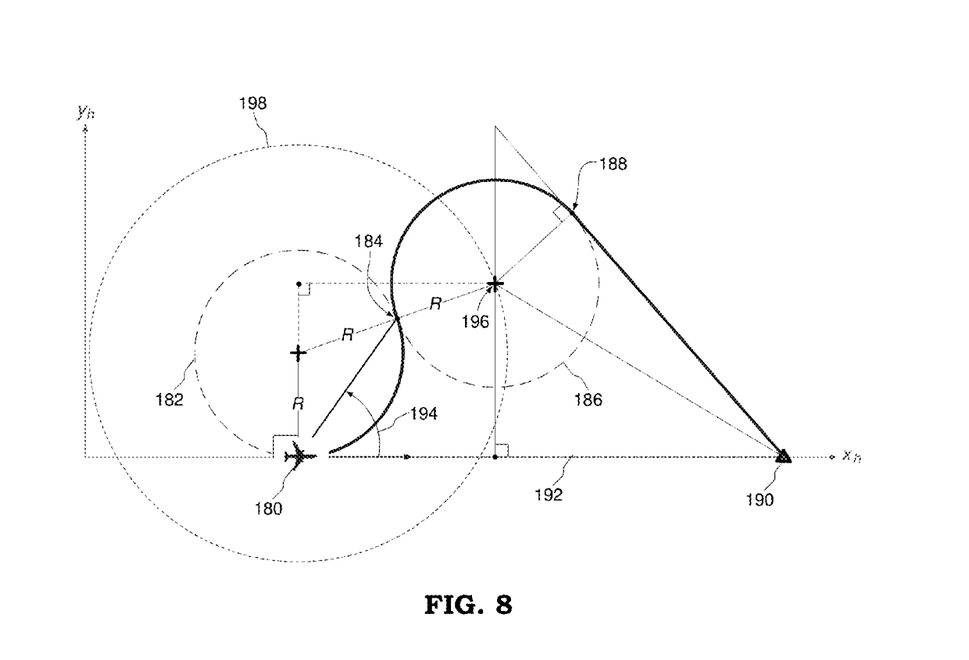
FIG. 8 is an illustration of the S-turn extension geometry associated with a preferred embodiment of the present invention.

FIG. 8 shows an example path elongation using a concatenation of a left curve, right curve and straight segment that allows the aircraft to deviate from the original path and increase the track distance. The deviation initiates at a start position 180 and follows an arc on circle 182 up to a point 184. A right turn is then conducted along circle 186 up to a point 188, where the aircraft continues on a straight path towards the target fix 190. A symmetrical right hand extension is also possible by using a right turn, followed by a left turn and a straight-line section. Due to its nature, the continuous manoeuvre is referred to an S-turn pattern in this text to differentiate it from the triangular dogleg patterns described above.

For the construction of the S-turn for a left-hand manoeuvre, the aircraft is represented as flying along the local horizontal axis 192 towards the target fix 190. This orientation is mathematically achieved by rotating the original flight leg onto the x-axis. This rotation is required during the computation of the S-turn as all the calculations are based on this assumption. Once an S-turn solution is identified, it is then rotated back onto the original heading of the flight leg before being executed. The S-turn manoeuvre requires a start point and an end point, 180 and 190 respectively. The elongation distance depends on the turn radii of the circles 182 and 186, together with the value of the angle 194 that defines the position of the tangent point 184 on circle 182. If all turn radii are fixed, then the angle 194 is the only variable defining the S-turn and can be solved using a known numerical solver. The locus of all the possible positions of the centre point 196 results in the circle 198, as shown in FIG. 8.

To reduce the number of unknowns when planning the S-turn extension, two simplifications are used in the present embodiment. The first consists of approximating all turns using a constant radius R, computed as $R=V_g^2/g \tan \Phi_{nom}$, where $V_g=V_{tas}+V_{wind}$. The second simplification ignores the final heading of the aircraft at the target waypoint, allowing the aircraft to overfly at any heading angle, up to a predefined maximum acceptable deviation angle.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for determining an energy recovery profile for an aircraft needed to arrive at a point along a flight path further ahead of the aircraft at as close to a desired time of arrival and energy level of a flight plan as possible, the method including:
   monitoring and assessing an energy state of the aircraft and any time deviation with respect to the flight plan prior to start of a descent phase of the flight plan and throughout the descent phase of a flight;
   comparing the current energy state to the expected energy state;
   identifying a trajectory and corresponding aircraft states that allows the aircraft to arrive at the point in space ahead of the aircraft at a speed, altitude and time as close to the flight plan as possible;
   generating adjustments to the flight plan based on energy recovery requirements to produce an energy recovery profile pertaining to the identified trajectory and aircraft states, the energy recovery profile including lateral and vertical deviations from a planned flight path; and
   outputting the energy recovery profile to at least one of a display device and a flight management system of the aircraft.

2. The method of claim 1, further comprising monitoring the energy state of the aircraft during the descent phase of the flight plan and triggering the method when at least one of an incorrect energy condition or incorrect time of arrival is detected.

3. The method of claim 1, further comprising inserting path extensions into the flight plan when an amount of track miles needed to be flown to a target fix is more than the amount of miles planned in the flight plan.

4. The method of claim 1, wherein the comparing includes comparing an amount of excessive energy at a future position along the current flightplan with a target energy constraint defined at the said future position.

5. The method of claim 1, wherein the lateral and vertical deviations are calculated in succession during identifying the trajectory and corresponding aircraft states.

6. The method of claim 5, wherein the lateral deviation is determined based on the vertical deviation calculated.

7. The method of claim 1, wherein generating adjustments to the flight plan includes changes to at least one of autothrust modes, speed targets, speed-brake deployment and remaining track miles.

8. The method of claim 7, wherein the adjustments to the flight plan are generated in real-time.

9. An energy recovery system that monitors energy and time states of an aircraft and defines flight strategies to enable the aircraft to arrive at a target point with a desired energy and/or at a desired time, the system comprising:
   an input/output device that supports wired and/or wireless communication;
   a data storage device;
   a user input device;
   a display device; and a computational unit including a processor configured to execute instructions implementing an energy recovery process and a memory unit a storing instruction for implementing the energy recovery process, the computational unit including:

an aircraft state monitor configured to continuously monitor and assess an energy state of the aircraft and any time deviation with respect to a flight plan prior to start of a descent phase of the flight plan and throughout the descent phase of the flight, a state predictor configured to predict an expected energy and time-of-arrival at a selected point ahead of the aircraft along a particular recovery path, a recovery search manager configured to receive data from the aircraft state monitor and the state predictor and identify a recovery plan that brings aircraft energy from a current state to a desired state with minimal violation of time constraints, a path planner configured to receive data from the recovery search manager and generate adjustments to the flight plan including lateral and vertical deviations from a planned flight path based on the data received from the recovery search manager to produce the recovery plan, and an output interface configured to receive the recovery plan from the path planner and output the recovery plan to at least one of the display and a flight management system.

10. The energy recovery system of claim 9, wherein the recovery search manager is further configured to identify the recovery plan based on status of an autopilot mode, calibrated airspeed target, distance-to-fix, speedbrakes duration, and rate-of-descent.

11. The energy recovery system of claim 9, wherein the path planner is further configured to insert path extensions into the flight plan if the path planner determines that track miles needed to be flown to a target fix is more than the amount of miles planned in the flight plan.

* * * * *